United States Patent
Tran et al.

(10) Patent No.: US 9,976,420 B2
(45) Date of Patent: May 22, 2018

(54) ASPIRATING SEAL ASSEMBLY AND METHOD OF ASSEMBLING

(71) Applicant: General Electric Company, Schenectady, NY (US)

(72) Inventors: Quang Tue Nguyen Tran, Bayern (DE); Rodrigo Rodriguez Erdmenger, Bayern (DE); Christopher Jon Potokar, Whitefish Bay, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 227 days.

(21) Appl. No.: 14/807,376

(22) Filed: Jul. 23, 2015

(65) Prior Publication Data

US 2017/0022837 A1    Jan. 26, 2017

(51) Int. Cl.
*F01D 5/04* (2006.01)
*F01D 11/02* (2006.01)

(52) U.S. Cl.
CPC .............. *F01D 5/046* (2013.01); *F01D 5/048* (2013.01); *F01D 11/025* (2013.01); *Y02E 20/14* (2013.01); *Y02T 50/673* (2013.01)

(58) Field of Classification Search
CPC ........ F01D 5/046; F01D 5/048; F01D 11/025; F01D 11/00; F01D 11/02; F01D 5/02; F01D 9/02; F01D 11/001; F05D 2240/55; F05D 2220/30; F05D 2230/60; F05D 2240/56

See application file for complete search history.

(56) References Cited

U.S. PATENT DOCUMENTS

| | | |
|---|---|---|
| 5,284,347 A | 2/1994 | Pope |
| 5,311,734 A | 5/1994 | Pope et al. |
| 6,145,844 A | 11/2000 | Waggott |
| 6,257,586 B1 | 7/2001 | Skinner et al. |
| 6,676,369 B2 | 1/2004 | Brauer et al. |
| 8,105,021 B2 | 1/2012 | Glahn et al. |
| 8,109,716 B2 | 2/2012 | Glahn et al. |
| 8,109,717 B2 | 2/2012 | Glahn et al. |
| 8,740,224 B2 | 6/2014 | Zheng et al. |

(Continued)

OTHER PUBLICATIONS

Athavale, M.M. et al.; Analysis of Coupled Seals, Secondary and Powerstream flow Fields in Aircraft and Aerospace Turbomachines; NASA/CR 2005-212716 published Nov. 2005; 160 pp.

*Primary Examiner* — Dwayne J White
*Assistant Examiner* — Justin A Pruitt
(74) *Attorney, Agent, or Firm* — Nitin N. Joshi

(57) ABSTRACT

An aspirating seal assembly for use in a turbine engine is provided. The aspirating seal assembly includes a face seal and a rotary component. The face seal includes a first annular seal surface, and the rotary component includes a second annular seal surface positioned adjacent the first annular seal surface and defining a seal interface therebetween. The face seal is configured to discharge a flow of air towards the seal interface. The seal assembly also includes a first seal member extending between the first and second annular seal surfaces such that the flow of air induces a back pressure across the seal interface, and a second seal member positioned radially inward from the first seal member and extending between the first and second annular seal surfaces. A length of the second seal member is selected to increase the back pressure induced across the seal interface.

20 Claims, 6 Drawing Sheets

(56) References Cited

U.S. PATENT DOCUMENTS

2003/0185669 A1* 10/2003 Brauer ................... F16J 15/442
 415/111
2004/0207158 A1 10/2004 Agrawal et al.
2008/0018054 A1 1/2008 Herron et al.

* cited by examiner

ASPIRATING SEAL ASSEMBLY AND METHOD OF ASSEMBLING

BACKGROUND

The present disclosure relates generally to gas or steam turbines and, more specifically, to an aspirating face seal having improved bearing force and stiffness.

Rotary machines, such as gas turbines, are often used to generate power with electric generators or for aircraft propulsion. Gas turbines, for example, have a gas path that typically includes, in serial-flow relationship, an air intake, a compressor, a combustor, a turbine, and a gas outlet. Compressor and turbine sections include at least one row of circumferentially-spaced rotating buckets or blades coupled within a housing. At least some known turbine engines are used in cogeneration facilities and power plants. Engines used in such applications may have high specific work and power per unit mass flow requirements.

At least some known rotary machines use aspirating face seals to reduce leakage through a gap defined between stationary and rotating components of the gas turbine. Aspirating face seals are non-contacting seals that typically operate with a tight clearance between the stationary and rotating components. In operation, a pressurized fluid is channeled between opposing faces of the stationary and rotating components to facilitate maintaining the clearance therebetween as the components translate relative to each other. More specifically, a biasing face seal of the stationary component and the pressurized fluid facilitate ensuring the clearance is maintained when variations in the axial positioning of the rotating component relative to the stationary component occurs. However, large variations in the axial positioning of the rotating component can briefly overcome the force of the pressurized fluid, thereby resulting in rubbing and wear to the components of the aspirating face seal.

BRIEF DESCRIPTION

In one aspect, an aspirating seal assembly for use in a turbine engine including a stator assembly and a rotor assembly is provided. The aspirating seal assembly includes a face seal of the stator assembly and a rotary component of the rotor assembly. The face seal includes a first annular seal surface, and the rotary component includes a second annular seal surface positioned adjacent the first annular seal surface and defining a seal interface therebetween. The face seal is configured to discharge a flow of air towards the seal interface. The seal assembly also includes a first seal member extending between the first and second annular seal surfaces such that the flow of air induces a pressure drop across the seal interface, and a second seal member positioned radially inward from the first seal member and extending between the first and second annular seal surfaces such that the flow of air induces a back pressure across the seal interface. A length of the second seal member is selected to increase the back pressure induced across the seal interface.

In another aspect, a gas turbine engine is provided. The gas turbine engine includes a stator assembly including a face seal that includes a first annular seal surface, and a rotor assembly comprising a rotary component that includes a second annular seal surface positioned adjacent the first annular seal surface and defining a seal interface therebetween. The face seal is configured to discharge a flow of air towards the seal interface. The gas turbine engine also includes a plurality of seal members positioned between the stator assembly and the rotor assembly, wherein the plurality of seal members includes a first seal member extending between the first and second annular seal surfaces such that the flow of air induces a pressure drop across the seal interface, and a second seal member positioned radially inward from the first seal member and extending between the first and second annular seal surfaces such that the flow of air induces a back pressure across the seal interface. A length of said second seal member is selected to increase the back pressure induced across said seal interface.

In yet another aspect, a method of assembling an aspirating seal assembly for use in a turbine engine is provided. The method includes positioning a first annular seal surface of a face seal adjacent to a second annular seal surface of a rotary component such that a seal interface is defined therebetween. The face seal is configured to discharge a flow of air towards the seal interface. The method also includes extending a first seal member between the first and second annular seal surfaces such that the flow of air induces a pressure drop across the seal interface, positioning a second seal member radially inward from the first seal member, and extending the second seal member between the first and second annular seal surfaces such that the flow of air induces a back pressure across the seal interface. A length of the second seal member is selected to increase the back pressure induced across the seal interface.

DRAWINGS

These and other features, aspects, and advantages of the present disclosure will become better understood when the following detailed description is read with reference to the accompanying drawings in which like characters represent like parts throughout the drawings, wherein.

Figure 1:
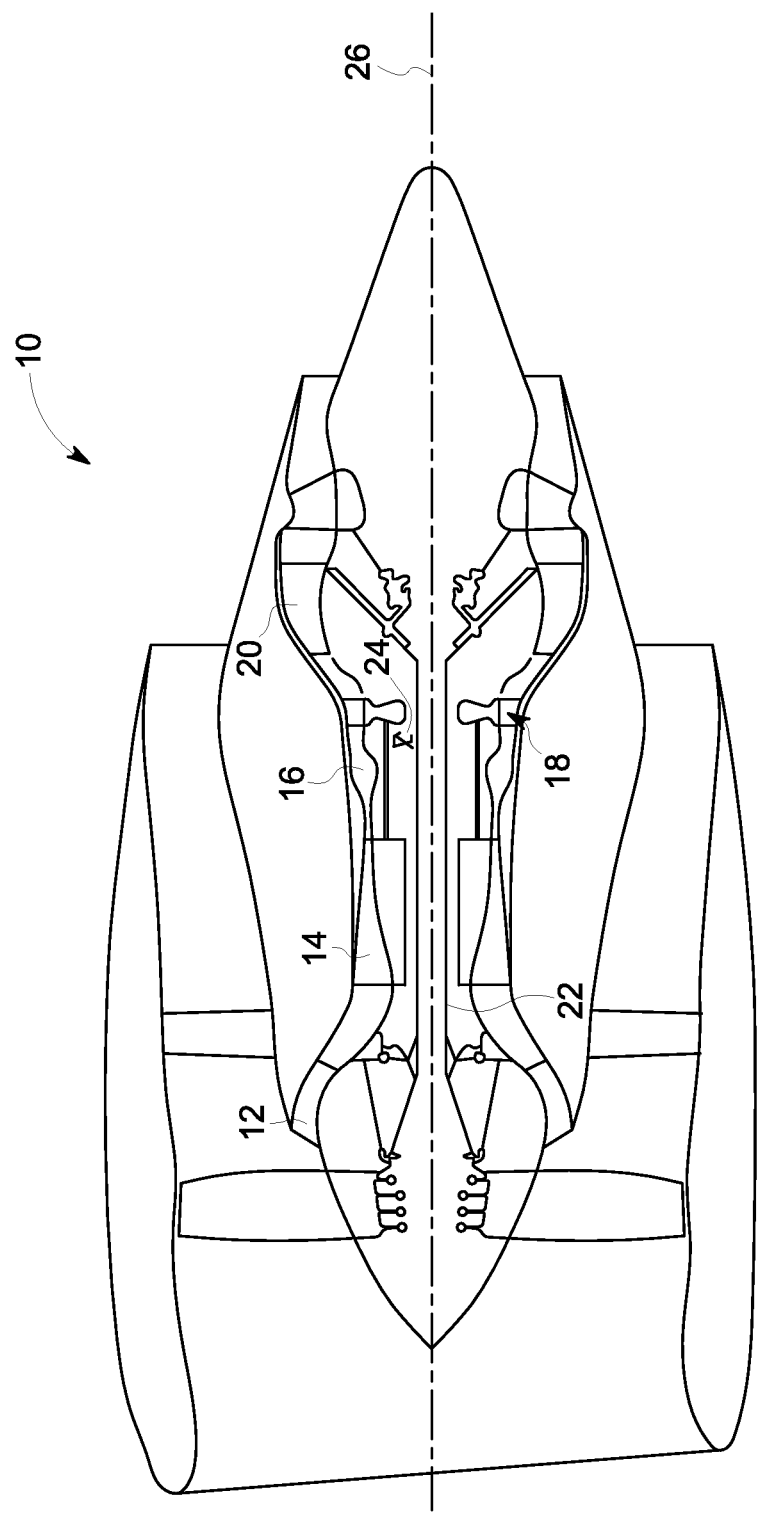
FIG. 1 is a schematic illustration of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to turbine engines and methods of assembling thereof. More specifically, the turbine engines described herein include an aspirating seal assembly that utilizes an additional seal member to facilitate increasing the pressurization of a seal interface defined between stationary and rotating components of the turbine engine. In the exemplary embodiment, the aspirating seal assembly includes a first seal member positioned radially outward from a face seal of the assembly, and a second additional seal member positioned radially inward from the face seal. The first seal member, and a leakage flow path extending between the first seal member and the face seal, facilitates inducing a pressure drop across the seal interface. The second seal member facilitates inducing a back pressure across the seal interface. As such, the bearing force and stiffness of the face seal is increased without modifying the geometry of the bearing face. Moreover, the bearing force and stiffness is controlled by varying the length of the second seal member, which modifies the size of a restrictive flow gap defined between the second seal member and a stationary component of the turbine engine.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine. It should also be appreciated that the term "fluid" as used herein includes any medium or material that flows, including, but not limited to, air, gas, liquid and steam.

FIG. 1 is a schematic illustration of an exemplary gas turbine engine 10. Engine 10 includes a low-pressure compressor 12, a high-pressure compressor 14, and a combustor assembly 16. Gas turbine engine 10 also includes a high-pressure turbine 18, and a low-pressure turbine 20 arranged in a serial, axial flow relationship. Low-pressure compressor 12 and low-pressure turbine 20 are coupled along a first shaft 22, and high-pressure compressor 14 and high-pressure turbine 18 are coupled along a second shaft 24.

In operation, air flows through low-pressure compressor 12 and compressed air is supplied from low-pressure compressor 12 to high-pressure compressor 14. The compressed air is discharged towards combustor assembly 16 and mixed with fuel to form a flow of combustion gas discharged towards turbines 18 and 20. The flow of combustion gas drives turbines 18 and 20 about a centerline 26 of gas turbine engine 10.

Figure 2:
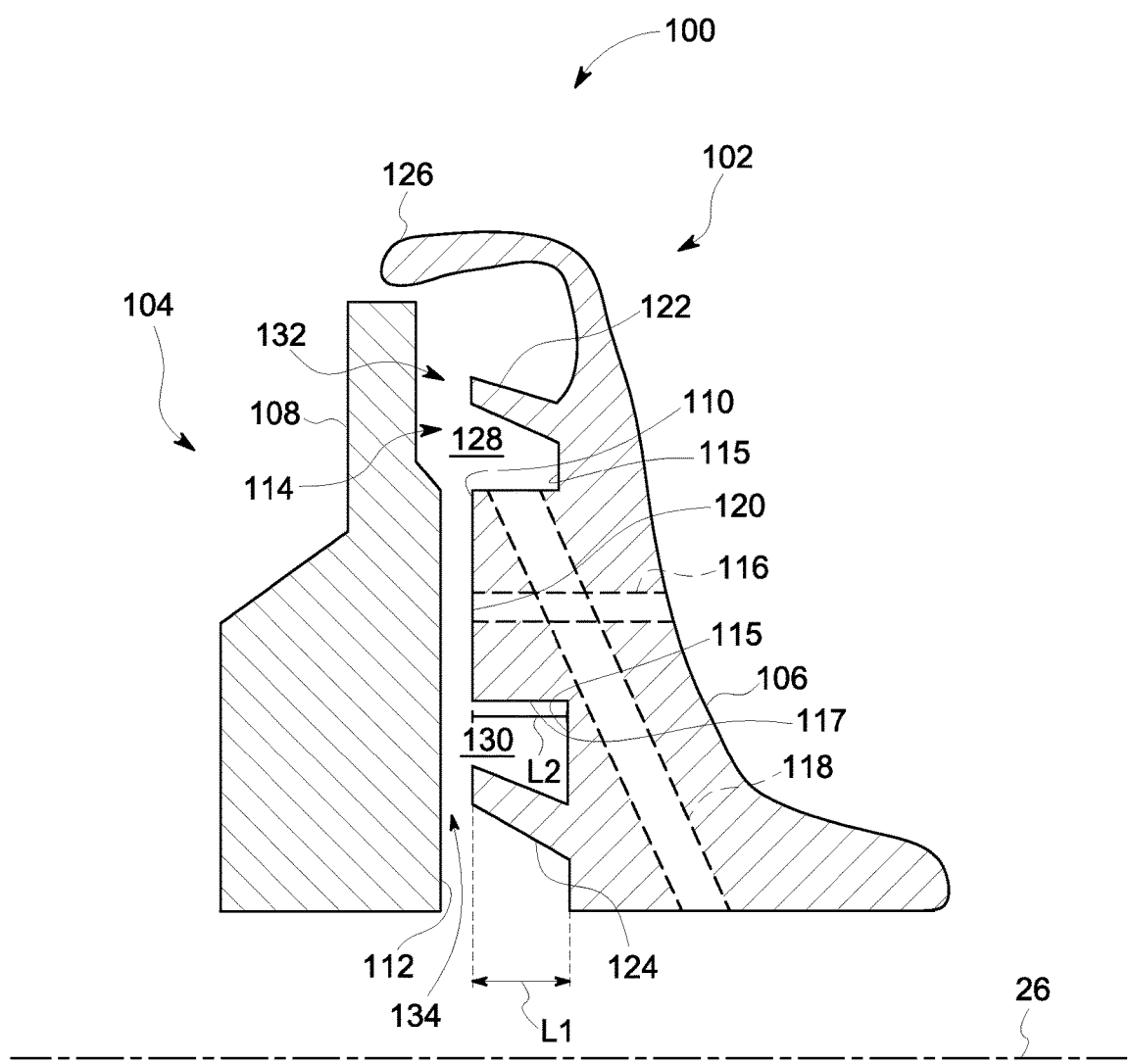
FIG. 2 is a cross-sectional schematic illustration of a first embodiment of an exemplary aspirating seal assembly that may be used in the gas turbine engine shown in FIG. 1.

FIG. 2 is a cross-sectional schematic illustration of a first embodiment of an aspirating seal assembly 100 that may be used in gas turbine engine 10 (shown in FIG. 1). In the exemplary embodiment, gas turbine engine 10 includes a stator assembly 102 and a rotor assembly 104 each positioned about centerline 26. Portions of stator assembly 102 and rotor assembly 104 are operable with each other to form aspirating seal assembly 100. More specifically, aspirating seal assembly 100 includes a face seal 106 of stator assembly 102, and a rotary component 108 of rotor assembly 104. Face seal 106 includes a first annular seal surface 110, and rotary component 108 includes a second annular seal surface 112 positioned adjacent to first annular seal surface 110 to define a seal interface 114 therebetween. Face seal 106 further includes a third annular seal surface 115 defined on opposing sides of a bearing face 117 of face seal 106.

Face seal 106 also includes a fluid feed channel 116 and a fluid return channel 118 extending therethrough. Fluid feed channel 116 terminates at a plurality of apertures 120 defined in face seal 106. Fluid feed channel 116 extends through face seal 106, and is oriented such that a flow of air is discharged from face seal 106 through the plurality of apertures 120.

Gas turbine engine 10 also includes a plurality of seal members positioned between stator assembly 102 and rotor assembly 104. In the exemplary embodiment, the plurality of seal members includes a first seal member 122, a second seal member 124, and a third seal member 126. The combination of first seal member 122 extending between second and third annular seal surfaces 112 and 115 and fluid return channel 118 is such that the flow of air discharged from face seal 106 induces a pressure drop across seal interface 114, and such that a first leakage flow path 128 extends along seal interface 114 towards fluid return channel 118.

Second seal member 124 is positioned radially inward from first seal member 122, and radially inward from first annular seal surface 110. Second seal member 124 extends between second and third annular seal surfaces 112 and 115 such that a second leakage flow path 130 extends along seal interface 114 towards second seal member 124. More specifically, first seal member 122 is positioned radially outward from the plurality of apertures 120, and second seal member 124 is positioned radially inward from the plurality of apertures 120. As such, first leakage flow path 128 is defined between the plurality of apertures 120 and first seal member 122 through fluid return channel 118, and second leakage flow path 130 is defined between the plurality of apertures 120 and second seal member 124. In an alternative embodiment, second seal member 124 is positioned radially inward from first seal member 122 and extends substantially radially between stator assembly 102 and rotor assembly 104.

Third seal member 126 is positioned upstream from first seal member 122 relative to the plurality of apertures 120, and facilitates inducing a pressure drop across seal interface 114 when gas turbine engine 10 is in startup operation. For example, when gas turbine engine 10 is startup operation, face seal 106 is located a greater axial distance from rotary component 108 than when gas turbine engine 10 is in steady state operation. As such, third seal member 126 provides a primary restrictive flow path for the flow of air discharged from face seal 106. As gas turbine engine 10 begins operating, face seal 106 translates axially towards rotary component 108, and first seal member 122 provides the primary restrictive flow path. As such, a clearance between third seal member 126 and stator assembly 102 is within a range between about 1 mil and about 100 mils, and operates with a pressure differential within a range between about 1 psi and about 60 psi.

In one embodiment, first and second seal members 122 and 124 are coupled to rotary component 108 and extend towards third annular seal surface 115 of face seal 106. As such, a first restrictive flow gap 132 is defined between first seal member 122 and second annular seal surface 112, and a second restrictive flow gap 134 is defined between second seal member 124 and second annular seal surface 112. Alternatively, one or both of first and second seal members 122 and 124 are coupled to face seal 106 and extend towards second annular seal surface 112 of rotary component 108. Moreover, the seal members are any seals that enable aspirating seal assembly 100 to function as described herein. Exemplary seal members include, but are not limited to, a labyrinth seal or a brush seal. Further, when embodied as a labyrinth seal, first and second seal members 122 and 124 can include more than one tooth.

Second seal member 124 facilitates inducing a back pressure across seal interface 114 at second leakage flow path 130 from the flow of air discharged from face seal 106. The back pressure induced by second seal member 124 pressurizes seal interface 114 to facilitate separating face seal 106 from rotary component 108 during operation of gas turbine engine 10. For example, second seal member 124 restricts the flow of air channeled through second leakage flow path 130 such that a portion of the flow of air induces a back pressure across seal interface 114, and increases the pressurization of seal interface 114 when compared to the pressurization when only first seal member 122 extends between second and third annular seal surfaces 112 and 115. More specifically, a length L1 of second seal member 124 or a length L2 of bearing face 117 of face seal 106 is selected to increase the back pressure induced across seal interface 114. Increasing length L of second seal member 124 facilitates reducing the clearance of second restrictive flow gap 134, which increases the back pressure induced across seal interface 114. As such, second seal member 124 facilitates increasing the pressurization of seal interface 114, and facilitates increasing bearing force and stiffness of face seal 106 without modifying the geometry of first and third annular seal surfaces 110 and 115.

The clearance of first restrictive flow gap 132 relative to the clearance of second restrictive flow gap 134 facilitates determining the increase in back pressure induced across seal interface 114 caused by second seal member 124. In some embodiments, a predetermined clearance is defined between first and second annular seal surfaces 110 and 112, and second restrictive flow gap 134 has a clearance that is greater than, less than, or substantially equal to the predetermined clearance. More specifically, length L1 of second seal member 124 is selected such that any difference between the clearances of first and second restrictive flow gaps 132 and 134 can be utilized that enables aspirating seal assembly 100 to function as described herein.

For example, in one embodiment, first restrictive flow gap 132 has a predetermined clearance of less than about 20 mils (0.508 millimeters (mm)). Moreover, when a clearance of second restrictive flow gap 134 is ±40 percent of the predetermined clearance, the average pressurization of seal interface 114 is modified about 10 percent.

Figure 3:
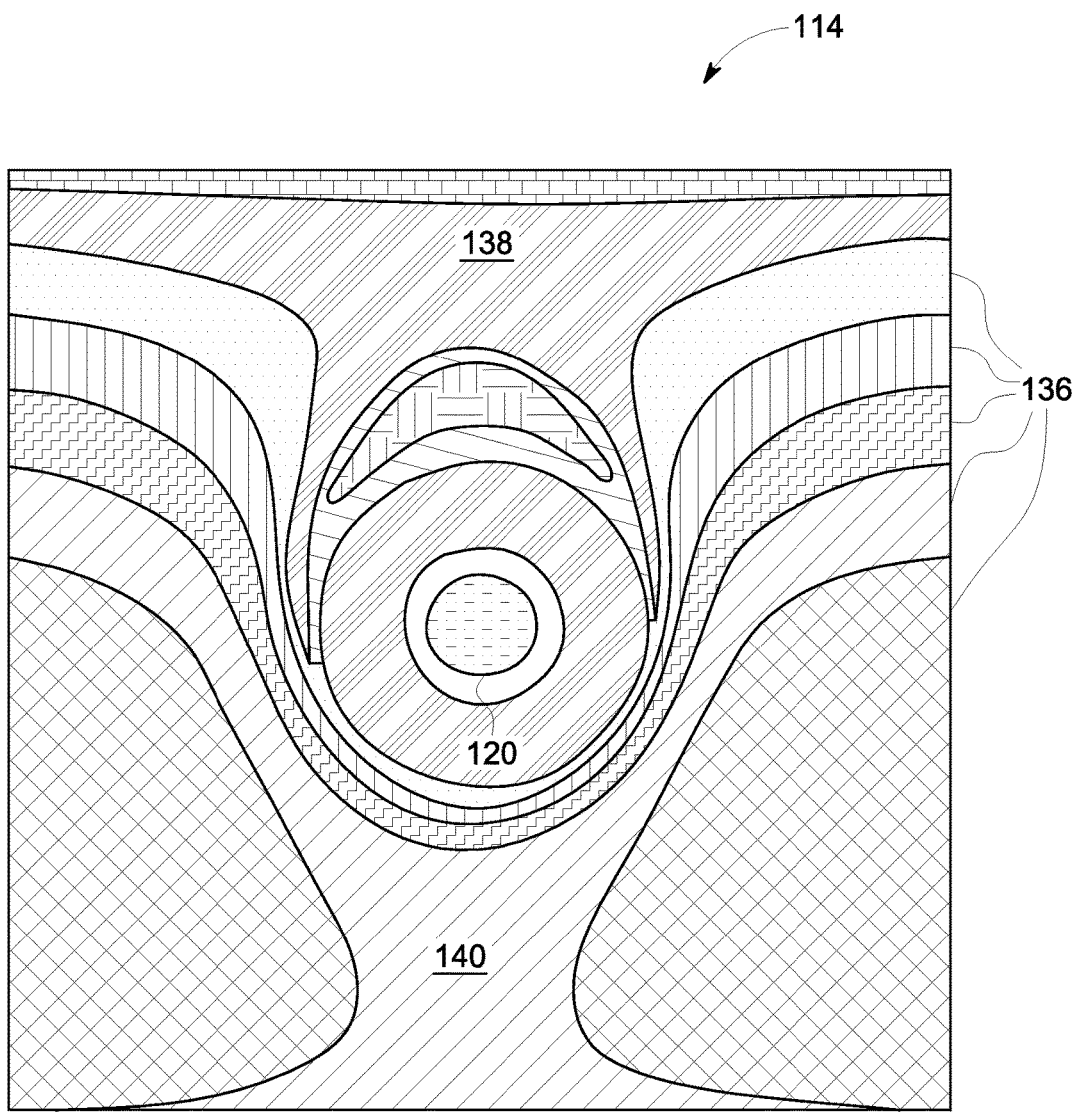
FIG. 3 is a schematic illustration of an exemplary pressure gradient across a seal interface that may be used in the aspirating seal assembly shown in FIG. 2.

FIG. 3 is a schematic illustration of an exemplary pressure gradient across seal interface 114. In the exemplary embodiment, a plurality of regions 136 each having different levels of pressurization are defined along seal interface 114. The pressurization of the plurality of regions 136 varies based on a radial location of each region 136 along seal interface 114. More specifically, the pressurization of the plurality of regions 136 varies based on a relative distance of each region 136 from second seal member 124. As such, the pressure in each of the plurality of pressurized regions 136 generally progressively increases from a radially outer portion 138 of seal interface 114 towards a radially inner portion 140 of seal interface 114.

Moreover, as described above, the increase in average back pressure induced across seal interface 114 is based on length L of second seal member 124 (shown in FIG. 2). In the exemplary embodiment, length L is selected such that a non-uniform pressure distribution is formed across seal interface 114. More specifically, first and second seal members 122 and 124 are oriented relative to face seal 106 such that the pressure induced across seal interface 114 is greater at radially inner portion 140 of seal interface 114 than at radially outer portion 138 of seal interface 114. As such, the increased pressure at radially inner portion 140 of seal interface 114 enables aspirating seal assembly 100 to be designed to facilitate reducing mechanical and thermal deformation of face seal 106 (i.e., coning).

Figure 4:
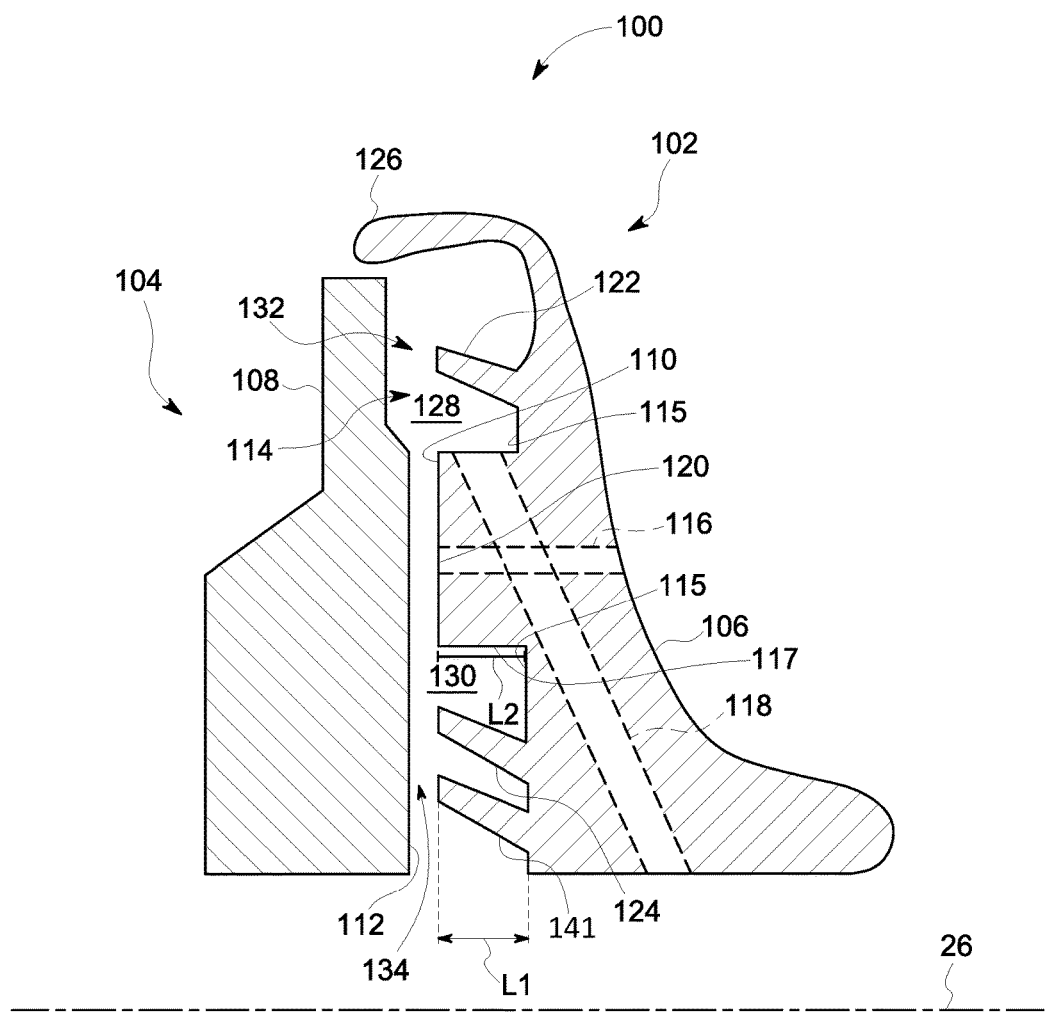
FIG. 4 is a cross-sectional schematic illustration of a second embodiment of an aspirating seal assembly that may be used in the gas turbine engine shown in FIG. 1.
Figure 5:
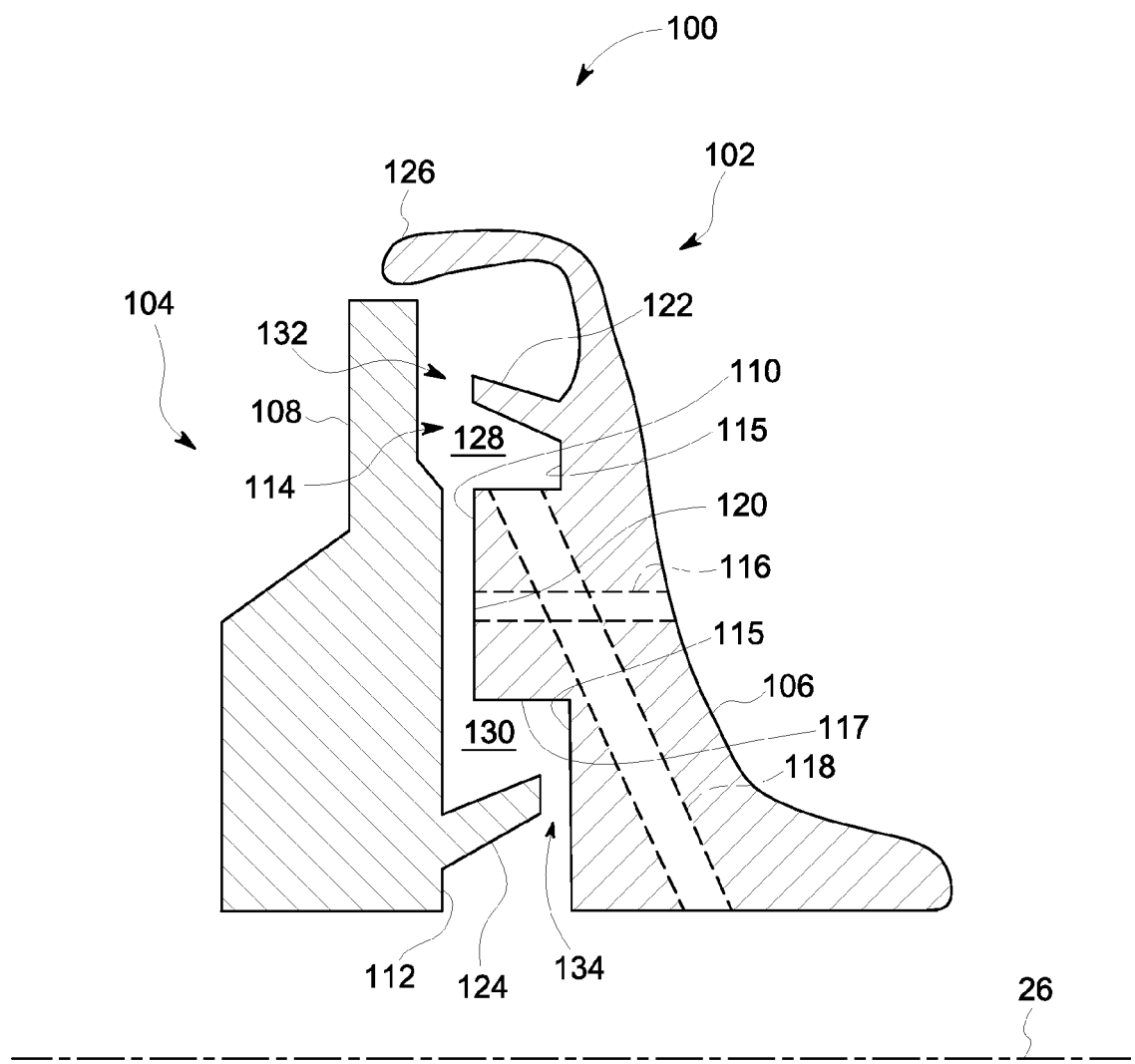
FIG. 5 is a cross-sectional schematic illustration of a third embodiment of an aspirating seal assembly that may be used in the gas turbine engine shown in FIG. 1.
Figure 6:
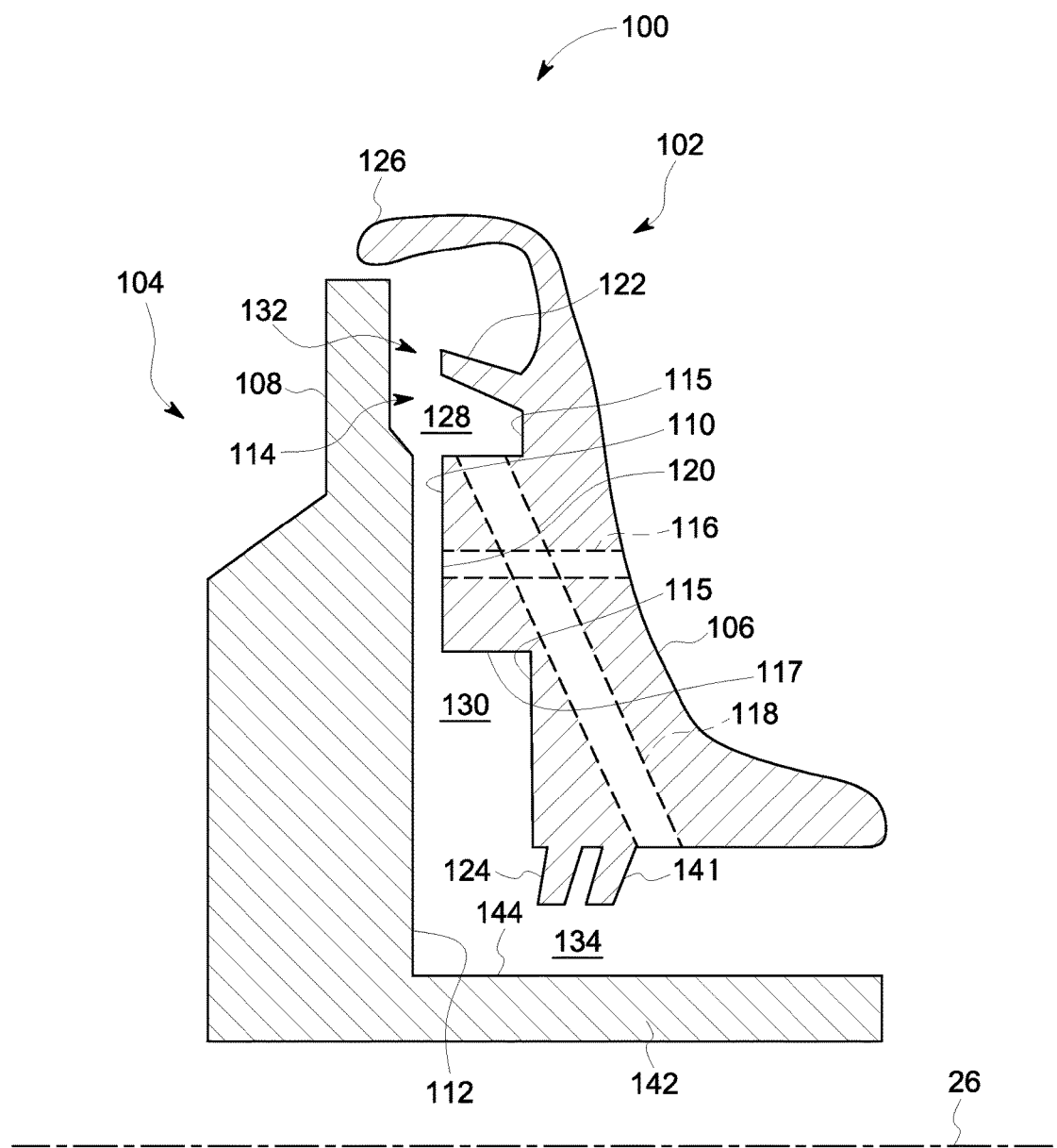
FIG. 6 is a cross-sectional schematic illustration of a fourth embodiment of an aspirating seal assembly that may be used in the gas turbine engine shown in FIG. 1.

FIG. 4 is a cross-sectional schematic illustration of a second embodiment of aspirating seal assembly 100, FIG. 5 is a cross-sectional schematic illustration of a third embodiment of aspirating seal assembly 100, and FIG. 6 is a cross-sectional schematic illustration of a fourth embodiment of aspirating seal assembly 100. Referring to FIG. 4, aspirating seal assembly 100 includes a fourth seal member 141 positioned radially inward from second seal member 124. Fourth seal member 141 provides additional back pressure across seal interface 114. Referring to FIG. 5, second seal member 124 is coupled to rotary component 108 and extends towards third annular seal surface 115 of face seal 106. As such, second restrictive flow gap 134 is defined between second seal member 124 and third annular seal surface 115. Alternatively, first seal member 122 is also coupled to face seal 106 and extends towards third annular seal surface 115. Referring to FIG. 6, a portion 142 of rotary component 108 extends axially along centerline 26 defining a circumferential seal surface 144. Moreover, second and fourth seal members 124 and 141 are coupled to face seal 106 and extend radially towards circumferential seal surface 144. As such, second restrictive flow gap 134 is defined between seal members 124 and 141 and circumferential seal surface 144. Alternatively, a single seal member extends towards circumferential seal surface 144, or the seal member is a brush seal. Moreover, alternatively, second and fourth seal members 124 and 141 are coupled to rotary component 108 along circumferential seal surface 144 and extend radially towards face seal 106.

The turbine engine and methods described herein relate to aspirating seal assemblies including a sealing arrangement that facilitates increasing the pressurization of a seal interface defined between stationary and rotating components of the aspirating seal assembly. For example, the sealing arrangement includes a primary seal member and a supplemental seal member extending between the stationary and rotating components. The primary seal member induces a pressure drop across the seal interface, and the supplemental seal member is positioned to facilitate inducing a back pressure across the seal interface. As such, increasing the pressurization of the seal interface with the supplemental seal member enables a fewer number of discharge apertures to be defined in a face seal of the seal assembly, which facilitates reducing flow leakage across the seal. Moreover, increasing the pressurization provides sufficient bearing force and stiffness to enable a counterbore opening typically defined in the face seal at the discharge apertures to be either eliminated or reduced in size. Forming a non-uniform pressure distribution across the seal interface also enables the face seal to be designed in such a way that reduces thermal and mechanical deformations thereof. As such, the aspirating seal assembly can be operated with a smaller clearance gap than if the seal interface were not as highly pressurized, and can be operated with a larger rub margin.

An exemplary technical effect of the aspirating seal assembly and methods described herein includes at least one of: (a) increasing the bearing force and stiffness of the face seal; (b) providing a mechanism for variably modifying the back pressure induced across a seal interface; and (c) reducing wear between stationary and rotating components of the turbine engine.

Exemplary embodiments of the aspirating seal assembly are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engines and related methods as described herein. Rather, the exemplary embodiment can be implemented and utilized in connection with many applications where improving aspirating seal configurations is desirable, such as in steam turbines, aeroderivative applications, and sealing compressor stages.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aspirating seal assembly for use in a turbine engine including a stator assembly and a rotor assembly, said aspirating seal assembly comprising:
    a face seal of the stator assembly, said face seal comprising a first annular seal surface and an axially extending bearing face;
    a rotary component of the rotor assembly, said rotary component comprising a second annular seal surface positioned adjacent said first annular seal surface and defining a seal interface therebetween, wherein said face seal is configured to discharge a flow of air towards said seal interface, and wherein said face seal further comprises a third annular seal surface defined on opposing sides of the axially extending bearing face;
    a fluid return channel extending radially inward from a radially outer most portion of the axially extending bearing face therethrough the face seal;
    first seal member extending between said first and second annular seal surfaces such that the flow of air induces a pressure drop across said seal interface; and
    a second seal member positioned radially inward from said first seal member and extending between said first and second annular seal surfaces such that the flow of air induces a back pressure across the seal interface, wherein a length of said second seal member is selected to increase the back pressure induced across said seal interface.

2. The assembly in accordance with claim 1, wherein the length of said second seal member is selected such that a non-uniform pressure distribution is formed across said seal interface.

3. The assembly in accordance with claim 1, wherein said first and second seal members are oriented relative to said face seal such that the back pressure induced across said seal interface is greater at a radially inner portion of said seal interface than at a radially outer portion of said seal interface.

4. The assembly in accordance with claim 1 further comprising a plurality of apertures defined in said face seal such that a first leakage flow path is defined between said plurality of apertures and said first seal member, and such that a second leakage flow path is defined between said plurality of apertures and said second seal member.

5. The assembly in accordance with claim 4, wherein said first seal member is positioned radially outward from said plurality of apertures, and said second seal member is positioned radially inward from said plurality of apertures.

6. The assembly in accordance with claim 1, wherein said first and second seal members are coupled to said rotary component and extend towards said first annular seal surface of said face seal.

7. The assembly in accordance with claim 1, wherein said first and second seal members comprise at least one of a labyrinth seal or a brush seal.

8. A gas turbine engine comprising:
    a stator assembly comprising a face seal that comprises a first annular seal surface and an axially extending bearing face;
    a rotor assembly comprising a rotary component that comprises a second annular seal surface positioned adjacent said first annular seal surface and defining a seal interface therebetween, wherein said face seal is configured to discharge a flow of air towards said seal interface, and wherein said face seal further comprises a third annular seal surface defined on opposing sides of the axially extending bearing face;
    a fluid return channel extending radially inward from a radially outer most portion of the an axially extending bearing face therethrough the face seal; and
    a plurality of seal members positioned between said stator assembly and said rotor assembly, wherein said plurality of seal members comprises:
        a first seal member extending between said first and second annular seal surfaces such that the flow of air induces a pressure drop across said seal interface; and
        a second seal member positioned radially inward from said first seal member and extending between said first and second annular seal surfaces such that the flow of air induces a back pressure across the seal interface, wherein a length of at least one of said second seal member and said axially extending bearing face is selected to increase the back pressure induced across said seal interface.

9. The gas turbine engine in accordance with claim 8, wherein the length of said second seal member is selected such that a non-uniform pressure distribution is formed across said seal interface.

10. The gas turbine engine in accordance with claim 8, wherein said first and second seal members are oriented relative to said face seal such that the back pressure induced across said seal interface is greater at a radially inner portion of said seal interface than at a radially outer portion of said seal interface.

11. The gas turbine engine in accordance with claim 8 further comprising a plurality of apertures defined in said face seal such that a first leakage flow path is defined between said plurality of apertures and said first seal member, and such that a second leakage flow path is defined between said plurality of apertures and said second seal member.

12. The gas turbine engine in accordance with claim 11, wherein said first seal member is positioned radially outward from said plurality of apertures, and said second seal member is positioned radially inward from said plurality of apertures.

13. The gas turbine engine in accordance with claim 8, wherein said first and second seal members are coupled to said rotary component and extend towards said first annular seal surface of said face seal.

14. The gas turbine engine in accordance with claim 8, wherein a portion of the rotary component extends axially along a centerline defining a circumferential seal surface and wherein the second seal member and an additional seal member are coupled to the face seal and extend radially towards the circumferential seal surface.

15. A method of assembling an aspirating seal assembly for use in a turbine engine, said method comprising:
    positioning a first annular seal surface of a face seal adjacent to a second annular seal surface of a rotary component such that a seal interface is defined therebetween, wherein the face seal is configured to discharge a flow of air towards the seal interface, the face seal further including an axially extending bearing face;
    extending a first seal member between the first and second annular seal surfaces such that the flow of air induces a pressure drop across the seal interface;
    positioning a second seal member radially inward from the first seal member; and
    extending the second seal member between the first and second annular seal surfaces such that the flow of air induces a back pressure across the seal interface, wherein a length of one of the axially extending bearing face or the second seal member is selected to increase the back pressure induced across the seal interface.

16. The method in accordance with claim 15, wherein extending the second seal member comprises determining the length of the second seal member such that a non-uniform pressure distribution is formed across the seal interface.

17. The method in accordance with claim 15 further comprising orienting the first and second seal members relative to the face seal such that the back pressure induced across the seal interface is greater at a radially inner portion of the seal interface than at a radially outer portion of the seal interface.

18. The method in accordance with claim 15 further comprising defining a plurality apertures in the face seal such that a first leakage flow path is defined between the plurality of apertures and the first seal member, and such that a second leakage flow path is defined between the plurality of apertures and the second seal member.

19. The method in accordance with claim 18 further comprising:
    positioning the first seal member radially outward from the plurality of apertures; and
    positioning the second seam member radially inward from the plurality of apertures.

20. The method in accordance with claim 15 further comprising:
    coupling the first and second seal member to the rotary component; and
    extending the first and second seal members from the rotary component towards the face seal.

* * * * *